F. B. CARLISLE.
APPARATUS FOR USE IN THE MANUFACTURE OF PNEUMATIC TIRE CASINGS.
APPLICATION FILED AUG. 2, 1919.
1,345,996.
Patented July 6, 1920.
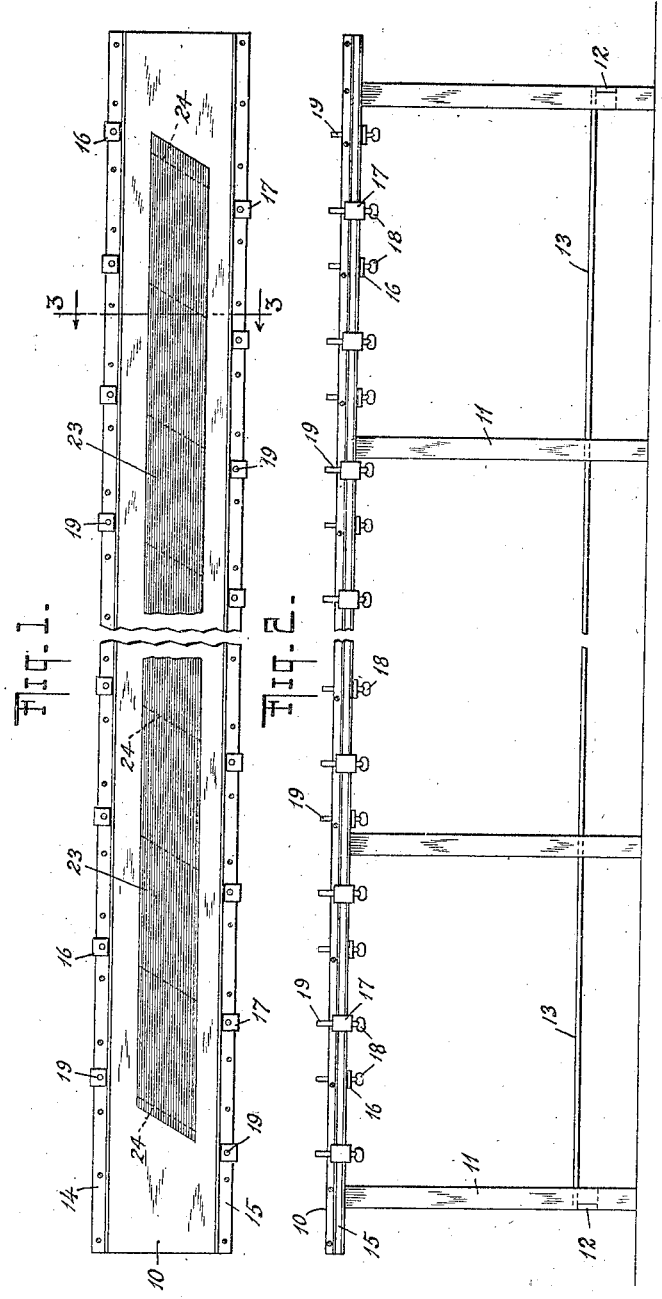
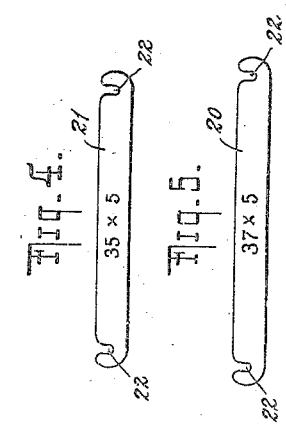
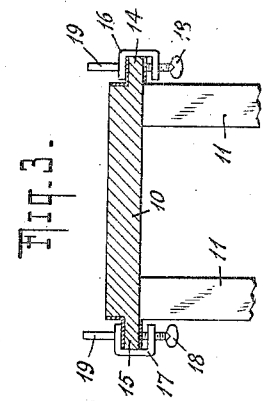
WITNESSES
INVENTOR
Fred B. Carlisle
BY
ATTORNEY

UNITED STATES PATENT OFFICE.

FRED B. CARLISLE, OF ANDOVER, MASSACHUSETTS, ASSIGNOR TO JOSEPH M. GILBERT, OF NEW YORK, N. Y.

APPARATUS FOR USE IN THE MANUFACTURE OF PNEUMATIC-TIRE CASINGS.

1,345,996. Specification of Letters Patent. Patented July 6, 1920.

Application filed August 2, 1919. Serial No. 314,932.

*To all whom it may concern:*

Be it known that I, FRED B. CARLISLE, a citizen of the United States, and resident of Andover, county of Essex, and State of Massachusetts, have invented certain new and useful Improvements in Apparatus for Use in the Manufacture of Pneumatic-Tire Casings, of which the following is a specification.

My invention relates to the manufacture of casings for pneumatic tires of the type generally designated as cord tires and has to do more particularly with tires of this description which, in part are constructed of strips or bands, including a plurality of cords preferably impregnated with rubber or rubber composition, and spaced annular members or rings upon and between which said bands are spirally wound. In order that efficient and uniform results may be obtained in the final products, it is essential that the strips or bands be combined with the annular members or, in other words, be spirally wound about and between the rings under the proper tension and with the convolutions in proper relation to each other. To obtain these results with any degree of certainty, it is desirable to provide the bands with indicating devices arranged in a manner to indicate exactly how the winding is to be carried out; this is preferably accomplished by means of lines produced upon said bands at the proper places and adapted to be brought into registry with the annular members and indicating the points at which the bands are to be folded or turned about said annular members during the winding operation. These lines to be of any valuable assistance must extend at the proper angles across the bands and must be properly located thereon in accurate spaced relation to each other. It will be obvious that the angles at which these lines or markings extend across the bands and their location and spacing thereon will vary according to the diameter or size of the finished product so that the marking of the bands must be carefully carried out in order to produce the desired and accurate results.

The object of my invention is to provide an improved apparatus whereby the desired markings may be accurately and quickly produced upon the bands of material and which may be readily adjusted to meet the varying conditions incident to the production of casings of different sizes.

Other objects of my invention will appear from the description hereinafter and the features of novelty will be pointed out in the appended claims.

In the accompanying drawings, which for illustrative and descriptive purposes show an example of my invention, Figure 1 is a plan view of my improved apparatus; Fig. 2 is an elevation thereof; Fig. 3 is a cross-section on the line 3—3 of Fig. 1; and Figs. 4 and 5 are face views of attachments forming part of my improvement.

As shown in the illustrated example, my improved apparatus comprises a table 10 of suitable dimensions and of any suitable material preferably mounted upon supporting legs 11 which, in order to insure stability, may be connected by cross-pieces 12 located at opposite ends and by a board or the like 13, which may extend throughout the length of the apparatus as shown in Fig. 2. At its opposite longitudinal edges the table 10 is kerfed or cut to provide guideways 14 and 15 which preferably are continuous throughout the length of the table 10 as shown in Fig. 1. A plurality of slides 16 and 17 are slidably mounted upon said guideways 14 and 15 respectively, so as to be adjustable thereon and are secured in their adjusted positions in any suitable manner as, for instance, by means of thumb screws or the like 18. The slides 14 and 15 are provided respectively with upright projections 19, one of which projects upwardly from each slide so as to extend somewhat higher than the upper surface of the table 10, as shown in Figs. 2 and 3. These projections 19 serve as abutments against which to rest a straight edge or the like and accordingly are so arranged with respect to each other as to position the said straight edge at the desired angle for the purpose to be more clearly described hereinafter. The apparatus further includes any number of spacing bars 20, 21, etc., of the kind, for instance, as illustrated in Figs. 4 and 5; these bars 20 and 21 are provided with notches or equivalent devices 22 adapted to accommodate the projections 19 for the purpose of spacing them apart, as will be more fully described hereinafter. The bars are made of metal or other suitable material and are of different dimensions calculated with respect to different sizes of casings; that is the notches or the like 22 of the bar 20 may be located so as to space the projections 19 apart a distance necessary to a 37 x 5 inch casing, while the notches 22 of the bar 21 may be adapted for a 35 x 5 inch casing, and so on: in some instances the different combinations of notches may be embodied in a single bar. In the preferred arrangement the bars are suitably marked to indicate the casing for which they are adapted, it being understood that any number of bars may be included as part of the equipment of the apparatus.

As the length and width of the band or strip and the angles at which the markings are drawn, vary according to the size of the casing to be produced, certain standards are preferably adopted for factory use. The length is readily calculated and as readily divided into equal divisions to provide the proper spacing between the projections 19, the aforesaid metal bars 20 and 21 with the notches 22 spaced apart to correspond to the distance between projections providing a ready means whereby the latter are properly set. The angles at which the markings must extend across the band are determined from a standard table and laid out, for instance, with a protractor—for example with 39 x 5 casing the angle may be 63°, while the angle for a 35 x 5 casing then would be 65° and so on. The proper angles are set up with respect to two opposed projections 19, for instance, the two first ones, and the remainder of said projections 19 are then set to their correct positions by the use of the appropriate metal spacing bar 20 or 21. Assuming that the finished casings are to comprise 37 x 5 inch tires, and that the two first projections 19 have been properly set with respect to each other, the one notch or the like 22 of the bar 20 is placed over said first projection 19 and the next or second slide 16 is moved along the guideway 14 until its pin or projection 19 is in registry with the second notch or the like 22 of said bar 20. This second notch 22 is then placed over said second pin 19 and the second slide 16 is secured in position; the bar 20 is then removed and moved along to bring its first notch 22 over said second projection or pin 19, after which the third slide 16 is shifted along the guideway until the second notch of the bar 20 may be placed over its pin 19, after which said third slide is secured in this position by means of its thumb screw 18. This operation is repeated until all of the slides 16 and their pins 19 have been properly spaced apart by means of the bar 20 and secured in position, after which the bar 20 is utilized in the same way to properly space the slides 17 and their pins 19 upon the guideway 15. If the casing is to be, for instance, 35 x 5, the bar 21 may be used to space the projections 19 after the first two have been properly set, it being understood that other spacing bars adapted for casings of still other dimensions may be used in the same way.

After the slides and their projections have been set and spaced apart, as described, the apparatus is ready for use. In practice, a strip or band of material 23 is placed upon the table 10 and positioned between the two rows of projections 19, after which a ruler, straight edge or other suitable implement is placed against two angularly opposite projections 19, beginning, say, at the right hand end of the band 23. This positions the ruler, straight edge or the like at the proper angle across said band of material to form a guide along which a pencil, crayon, or other readily visible agent may be moved to draw a line or mark 24 upon the surface of the band of material, to indicate where the latter is to be cut, or said cut, if not already made previously, may be directly made by passing a suitable cutting implement along said straight edge. The straight edge or the like is then successively placed against the other projections 19 of each row in contact with the upper surface of the band, and each time a line 24 is drawn across said band, whereby a series of lines are produced upon the surface of said band of material. When the two final projections 19, located for instance, at the left hand end of each row are reached, the band of material is cut along the straight edge; the opposite ends of said band thus extend on the bias at the proper angles required for the casing under construction. The lines 24, between said ends, extend in parallel relation to each other at the proper angles across said band of material, to provide visible indications whereby the band of material may be properly wound upon or combined with the annular members hereinbefore referred to. In other words, these lines, by being brought into registry with the annular members or rings, indicate to the operator the points at which said band of material is to be folded or turned alternately around said two annular members or rings. The proper spiral winding of the band of material about the annular members under the proper tension is thus absolutely assured so that efficient and uniform results are always guaranteed.

The apparatus is extremely simple in construction and of maximum efficiency and in a simple and convenient manner does away with guesswork and absolutely insures uniform and reliable results.

If desired, one or more drawers for the reception of the spacing bars or for other purposes may be included in the apparatus. It will be understood, as before stated, that instead of having a plurality of spacing bars, a single bar with a plurality of coöperating pairs of notches or the like may be provided, if desired.

Various changes in the specific form shown and described may be made within the scope of the claims without departing from the spirit of my invention.

I claim:—

1. An apparatus of the kind described comprising a table of a length to accommodate a band of material adapted to be helically wound about and between axially spaced annular members to form a carcass, and a plurality of projections mounted upon said table in spaced, parallel rows for positioning a guiding device transversely across said band to indicate the locations of markings thereon, said projections being independently adjustable in each row to fixed positions in predetermined accord with said carcass whereby the aforesaid markings accurately define the turns at which said band is to be folded about said annular members in its helical path.

2. An apparatus of the kind described comprising a table and a plurality of positioning projections adjustably mounted thereon in spaced rows and independently adjustable to fixed positions in each row having definite predetermined relation to each other and to the projections in the opposite row.

3. An apparatus of the kind described comprising a table, a plurality of projections adjustably mounted thereon in spaced parallel rows and a spacing bar whereby said projections are successively spaced apart at predetermined distances.

4. An apparatus of the kind described comprising a table, a plurality of slides adjustably mounted thereon in spaced, parallel rows, positioning projections carried by and extending upwardly from said slides, the projections of one row being angularly disposed with respect to the projections of the other row, and means for spacing said projections apart at predetermined distances.

5. An apparatus of the kind described comprising a table, guideways extending lengthwise of said table at opposite edges thereof, a plurality of slides adjustable along said guideways, positioning projections extending upwardly from said slides, the latter being independently adjustable along each guideway to positions having definite, predetermined relation to each other and to the slides on the opposite guideway, and means for securing said slides in adjusted positions.

6. In an apparatus of the kind described and including a table and a plurality of projections adjustably mounted thereon and a spacing bar independent of the apparatus and provided with means coöperating with an adjusted projection to space a succeeding projection therefrom in predetermined, fixed relation.

7. In an apparatus of the kind described and including a table and a plurality of projections adjustably mounted thereon and a spacing bar independent of the apparatus and provided with notches whereby one projection is spaced from a preceding, adjusted projection in predetermined, fixed relation.

In testimony whereof, I have hereunto set my hand.

FRED B. CARLISLE.